G. ATTERBURY.
APPARATUS FOR MOLDING OR CASTING.
APPLICATION FILED MAR. 8, 1917.
1,289,599.
Patented Dec. 31, 1918.
3 SHEETS—SHEET 3.
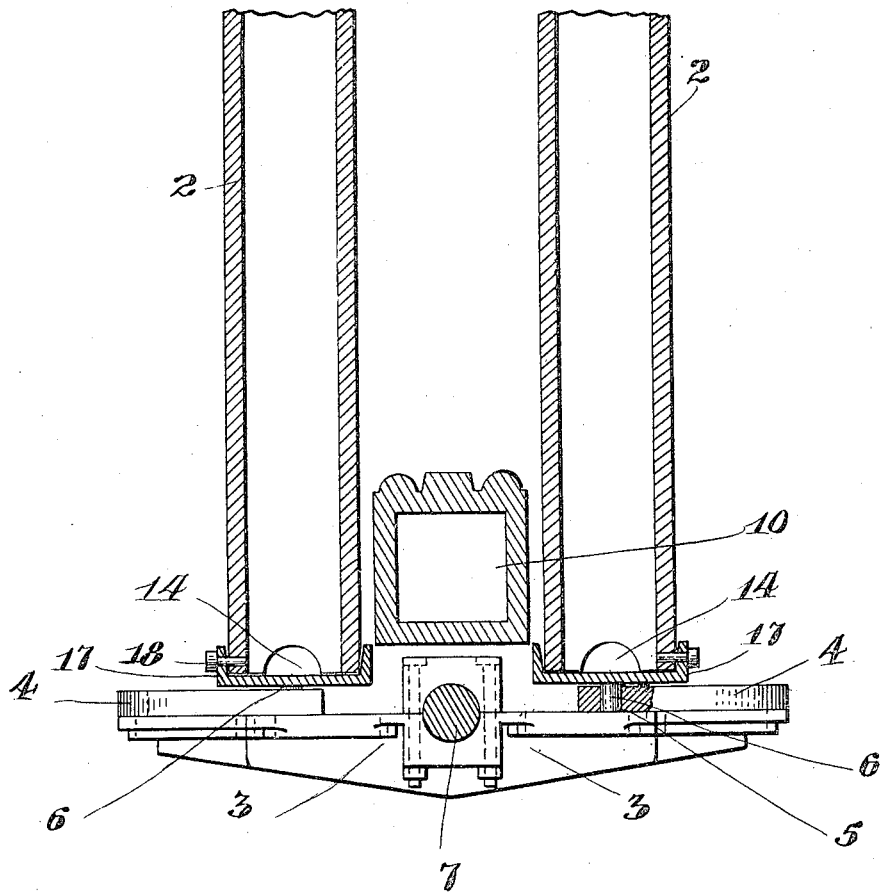

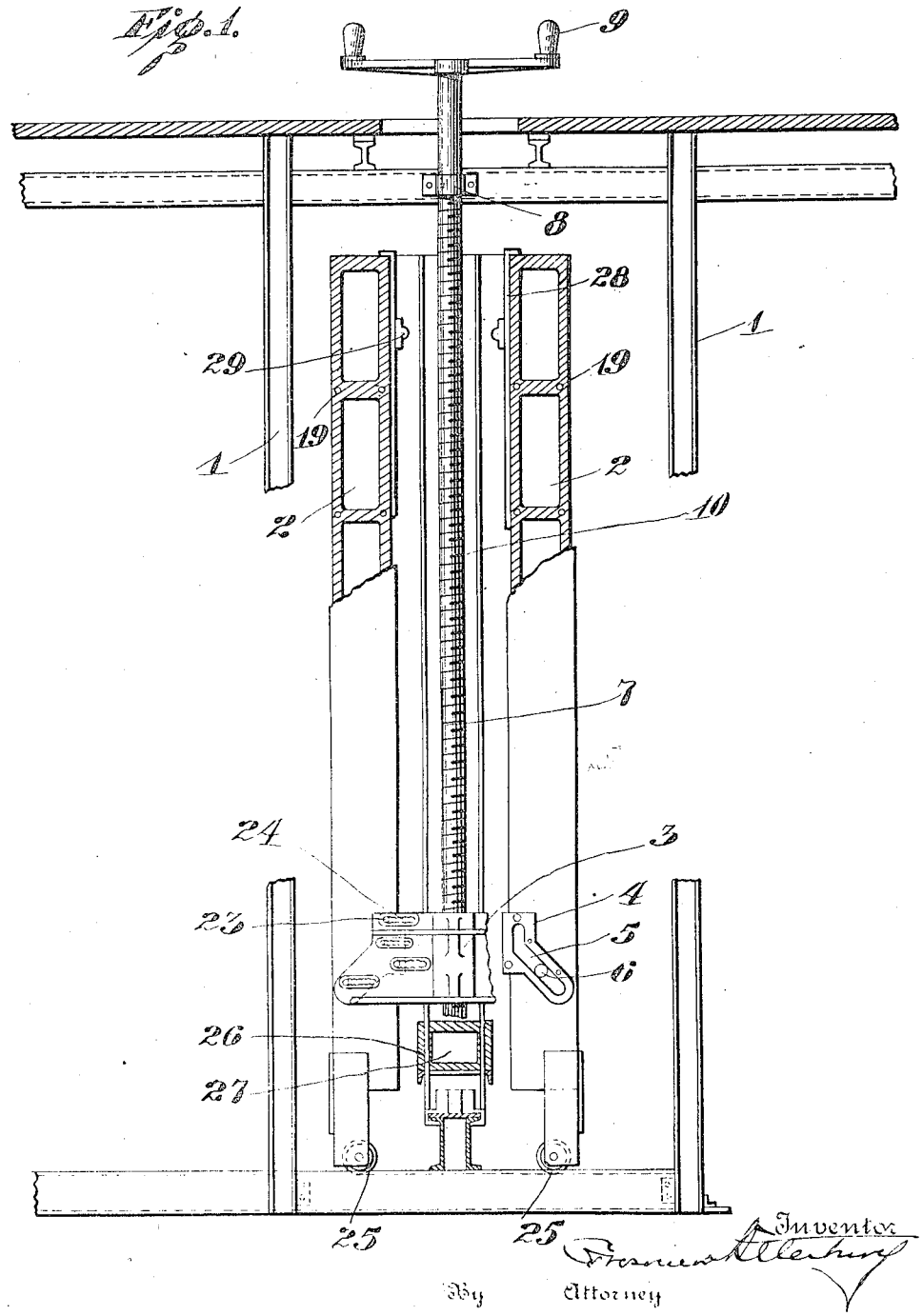

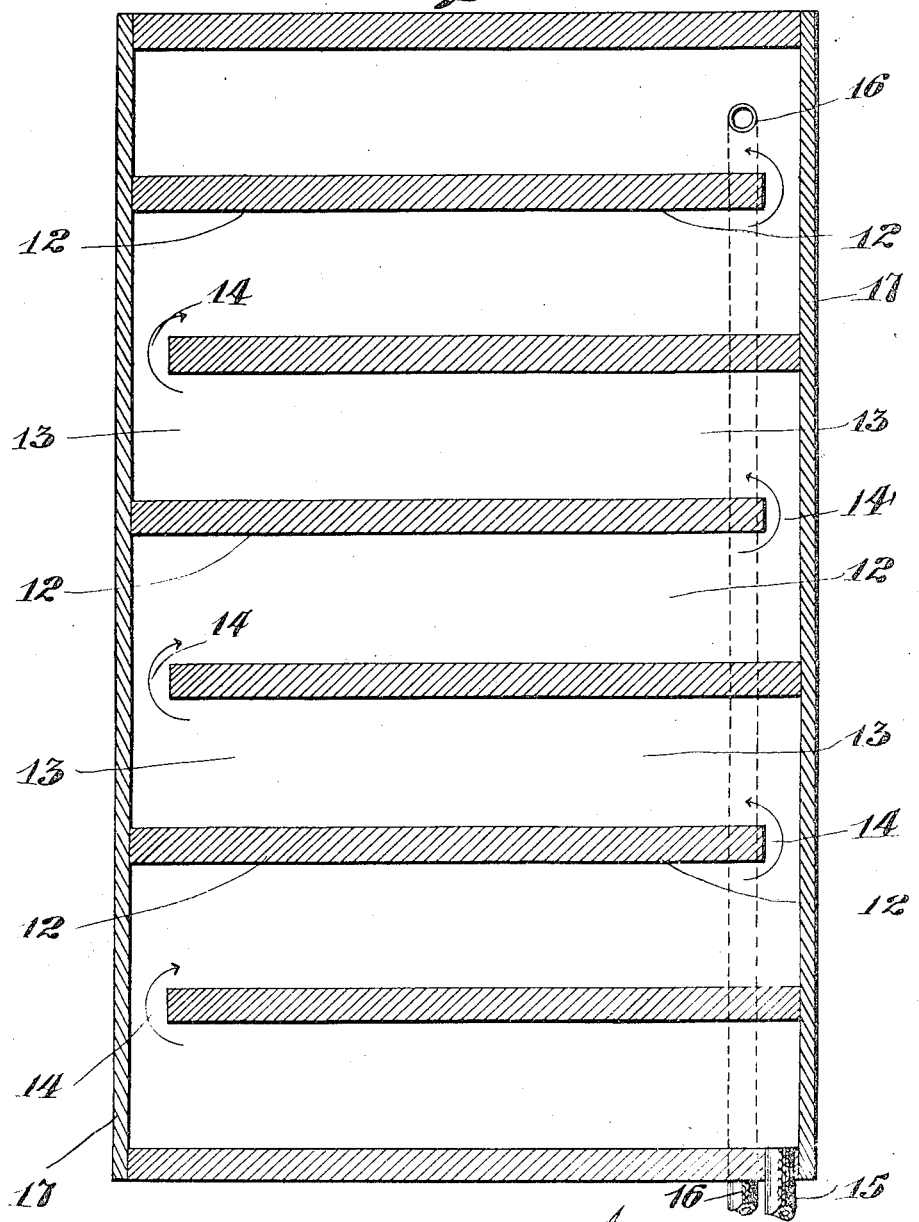

UNITED STATES PATENT OFFICE.

GROSVENOR ATTERBURY, OF NEW YORK, N. Y., ASSIGNOR TO STANDARDIZED HOUSING CORPORATION, A CORPORATION OF DELAWARE.

APPARATUS FOR MOLDING OR CASTING.

1,289,599.	Specification of Letters Patent.	Patented Dec. 31, 1918.

Application filed March 8, 1917. Serial No. 153,264.

*To all whom it may concern:*

Be it known that I, GROSVENOR ATTERBURY, a citizen of the United States, and a resident of the borough of Manhattan, city, county, and State of New York, have invented certain new and useful Improvements in Apparatus for Molding or Casting, of which the following is a description.

My present invention relates to apparatus for casting or molding concrete or cementitious blocks or sections adapted for use in building houses or other structures, and particularly relates to apparatus for casting blocks of large dimensions.

Molding devices of this general type are customarily provided with side and end walls of metal. This results in their being heavy and burdensome to transport from place to place, as well as expensive to build. Also, it is often found difficult, because of their extreme size, to give to the metal walls the desired rigidity, without using a prohibitive amount of material in their manufacture.

In order to obviate the above difficulties and with certain other objects in view, as will appear more fully hereinafter, I have conceived the idea of employing mold walls made of cementitious material and preferably of cellular construction, in place of the metallic walls now in common use. Walls of this character are found to be not only less expensive and easier to construct, but also more rigid than the ordinary metal walls.

When it is desired to transport to a job a number of molding devices, I need not, according to my present invention, transport all of the molding devices in their entirety, but may transport but a single complete device which, upon its arrival may be employed for the construction of the cementitious walls for the other molding devices, only the skeleton frames of which have been transported.

I preferably make the cementitious walls of cellular construction in order to decrease their weight and to provide for the circulation of hot air, steam, gas, or other fluid therein, so as to control the temperature of the casting.

I will now describe my present invention as applied to molding or casting apparatus, such as described in United States Patent No. 1,047,142, granted to me Dec. 17th, 1912. It is to be understood, however, that my invention is not limited to use in connection with apparatus of this particular type, it being shown and described as applied thereto merely as an illustration of one of the uses to which it may be put.

Referring to the drawings accompanying and forming a part of this specification: Figure 1 is an end elevation partly in section, of an embodiment of my invention, certain of the details of construction being omitted for the purpose of clearness. Fig. 2 is a vertical longitudinal section of one of the side walls of the device illustrated in Fig. 1; and Fig. 3 is a horizontal sectional view of a portion of the device illustrated in Fig. 1.

Referring in detail to the drawings, the numeral 1 indicates a frame in which the apparatus may be assembled. The apparatus comprises a mold having oppositely disposed vertical side walls 2, mounted to move horizontally on wheels 25, and connected by the vertically adjustable end members 3, of which but one is shown in Fig. 1, it being understood, however, that there is a similar member on the opposite side of the mold, and that preferably a second pair of such members is employed near the top of the mold, as indicated in my patent above referred to. The end members 3 preferably have adjustably secured thereto, plates 4, which contain slots 5 to receive the pins 6 fixed on side walls 2. The slots are inclined for a portion of their length with respect to the side walls, so that a vertical movement of the member containing the slots will produce a horizontal movement of the pins and side walls. Near the ends the slots are parallel with the side walls, so that when the pins rest in these portions the walls will be effectively locked against strains tending to open them. Screw-threaded shafts 7 are journaled in the members 8 so as to prevent their being moved longitudinally. Any suitable operating means, such as handles 9, may be employed for rotating the threaded shafts 7. The threads of the shafts 7 engage the end members 3, and the arrangement is such that when these shafts are rotated the end members will be moved vertically, causing the pins 6 to move in the slots 5 and either open or close the side walls of the mold, due to the movement of the pins 6 in the inclined slots. The parallel portions of the slots as above described are so located that when the mold is in closed position, the pins 6 will rest in these portions and thus effectively lock the mold in such position. The plates 4 are adjustable independently of the members 3 by varying the position of the bolts 23 in the slots 24. This permits of the mold being adjusted to cast blocks of varying thicknesses.

End walls 10, as indicated in Figs. 1 and 3, are provided, and any suitable means, such for instance as those described in my aforesaid patent, may be employed for moving these end walls toward and from each other in the operation of the device.

The apparatus above described is substantially the same as the apparatus of my aforesaid patent, and therefore forms no part of my present invention, except as to the particular form of side and end walls and bottoms which I employ, and which I will now describe in detail:

Instead of employing metallic side, end and bottom walls, I, according to my present invention, employ walls made of cementitious material and preferably of cellular construction, and provided with passages on the interior to permit of the circulation of fluid, such as steam, hot water, hot air, etc., to regulate the temperature during the molding. In Fig. 2 I have shown in longitudinal section a side wall constructed in a preferred manner. This side wall is seen to be substantially hollow and provided with a plurality of parallel partitions 12, which divide the interior into a plurality of parallel passages 13, through which the fluid may circulate. The passages are preferably closed at their ends by suitable side plates, such as the metallic channels 17 indicated in Fig. 3, to which the cementitious blocks are secured in any suitable manner as by the pins 18. In order to secure effective circulation, I preferably provide communication between each two adjacent passages by providing each of the partitions 12 with an aperture 14 adjacent one end thereof, the apertures of alternate partitions being adjacent opposite sides of the wall, as clearly shown in the drawing. As a result, the fluid circulates in a zigzag path and affects uniformly the entire surface of the wall. Any suitable means, such as indicated at 15 and 16, may be employed to provide ingress and egress for the circulating fluid.

The pins 6, wheels 25 and whatever additional devices the side walls are required to carry for the proper operation of the apparatus, are preferably permanently secured to the plates or channels 17, so that after the cementitious side walls 2 have been cast, all that is necessary to complete the apparatus is to secure them to the said plates 17. Suitable metallic reinforcements, such as indicated at 19, are preferably provided in the cementitious walls 2.

The end walls 10, which are also preferably of cementitious material and of cellular construction, may be constructed similarly to the side walls 2 above described, or may be provided with any other suitable means for insuring uniform circulation of fluids therein. The bottoms 26 likewise are preferably formed of cementitious material, and may be provided with passages as at 27, to permit a circulation of the heating medium therein.

From the above description it will be apparent that the cementitious walls provided with passages for the circulation of heating fluids, are not only of less expense to manufacture than the metallic walls now in common use, but also have many advantages thereover. They permit of a very exact control of the temperature of molding. They provide a rigidity which is lacking in mold walls heretofore used, and they can be rapidly and inexpensively constructed in the field, thus eliminating a large transportation expense, as has been indicated above. Also, by the use of these cementitious walls, I am enabled to very easily modify the molding surface in order to apply desired indents and ornamentations upon the molded blocks. This may be done by casting the ornamental features in or on the working surface of the walls so that they form an integral part thereof and will be reproduced on the blocks, or by forming such working surfaces of a cementitious mixture into which nails, tacks or screws may be driven to hold ornamental moldings in position. In some cases I prefer to suspend a sheet of metal or suitable fabric, as at 28, in front of and against the working surface of the wall, and to secure the ornamental moldings or features to these sheets, as shown at 29. This arrangement gives an easy means for changing the character of the mold surface.

What I claim is:

1. An apparatus for molding cementitious material comprising an integral block of cementitious material, said block having two parallel walls, one of which forms one face of the mold, said block having parallel ribs at right angles to said walls.

2. A molding apparatus provided with a wall, comprising a rigid integral block cast of cementitious material and having formed therein passages for the circulation of fluids, for the purpose described.

3. A molding apparatus provided with a wall, comprising a substantially hollow rigid integral block cast of cementitious material, said block being provided on the interior thereof with a series of substantially parallel partitions, alternate partitions being provided with apertures at opposite sides thereof, to provide for the circulation of fluid within said block, for the purpose described.

4. A molding apparatus provided with a wall, comprising a rigid integral block cast of cementitious material and having formed therein a plurality of parallel passages, adjacent passages being constructed to communicate alternately at opposite sides, metallic plates secured to the side edges of said block, to provide for the circulation of fluid in a zigzag direction through said passages, and means for supplying fluid to one of said passages, for the purpose described.

5. The combination with a mold wall, of a sheet held in front of the working surface thereof having ornamental moldings secured thereon for the purpose described.

GROSVENOR ATTERBURY.

Copies of this patent may be obtained for five cents each, by addressing the "Commissioner of Patents, Washington, D. C."